(12) United States Patent
Ochi et al.

(10) Patent No.: US 7,982,755 B2
(45) Date of Patent: Jul. 19, 2011

(54) IMAGE DISPLAY APPARATUS AND METHOD OF DRIVING IMAGE DISPLAY APPARATUS

(75) Inventors: Yutaka Ochi, Kanagawa-Ken (JP); Hideki Aiba, Ibaraki-Ken (JP)

(73) Assignee: Victor Company of Japan, Ltd., Kanagawa-ken (JP)

( * ) Notice: Subject to any disclaimer, the term of this patent is extended or adjusted under 35 U.S.C. 154(b) by 1049 days.

(21) Appl. No.: 11/824,921

(22) Filed: Jul. 3, 2007

(65) Prior Publication Data

US 2008/0074445 A1 Mar. 27, 2008

(30) Foreign Application Priority Data

Jul. 4, 2006 (JP) ................................ 2006-184539
Jun. 15, 2007 (JP) ................................ 2007-158112

(51) Int. Cl.

*G09G 5/10* (2006.01)
*G09G 5/00* (2006.01)
*G06F 3/038* (2006.01)
*G09G 3/36* (2006.01)

(52) U.S. Cl. .......................... 345/690; 345/87; 345/204

(58) Field of Classification Search ............ 345/87–111, 345/12, 63, 77, 581–618, 204, 690

See application file for complete search history.

(56) References Cited

U.S. PATENT DOCUMENTS 5,657,044 A * 8/1997 Makino ......................... 345/103
6,151,011 A 11/2000 Worley, III et al. ................. 5/10

FOREIGN PATENT DOCUMENTS

JP 2004-264695 9/2004 .......................... 3/36
JP 2005-352457 12/2005 .......................... 3/36

* cited by examiner

*Primary Examiner* — Srilakshmi K Kumar

(74) *Attorney, Agent, or Firm* — Renner, Kenner, Greive, Bobak, Taylor & Weber

(57) ABSTRACT

A method of driving an image display apparatus having a display section having a plurality of pixels arranged in a matrix. Each of a plurality of frames of a digital video signal are converted into a plurality of subframes having different display periods each shorter than a one-frame period, in order to display the video signal at a plurality of gradation levels. The pixels in the display section are driven by turning on or off the subframes according to a first subframe pattern to give each of the gradation levels to pixels in odd columns and odd rows and pixels in even columns and even rows among the pixels in the display section and a second subframe pattern to give each of the gradation levels to pixels in odd columns and even rows and pixels in even columns and odd rows among the pixels in the display section.

2 Claims, 13 Drawing Sheets

| SUBFRAME | | FIRST GROUP SF1 | SF2 | SF3 | SF4 | SF5 | SF6 | SF7 | SF8 | SECOND GROUP SF9 | SF10 | SF11 | SF12 | SF13 | SF14 | DISPLAY PERIOD DIFFERENCE | |
|---|---|---|---|---|---|---|---|---|---|---|---|---|---|---|---|---|---|
| DISPLAY PERIOD | | 1 | 2 | 4 | 8 | 16 | 32 | 64 | 128 | 64 | 64 | 32 | 32 | 16 | 16 | | |
| GRADATION LEVEL | GROUP | | | | | | | | | | | | | | | AB | AB' A'B |
| 0 | A0 | | | | | | | | | | | | | | | 0 | 1 |
| | B0 | | | | | | | | | | | | | | | | 1 |
| 1 | A1 | 1 | | | | | | | | | | | | | | 0 | 3 |
| | B1 | 1 | | | | | | | | | | | | | | | 3 |
| 2 | A2 | | 1 | | | | | | | | | | | | | 0 | 1 |
| | B2 | | 1 | | | | | | | | | | | | | | 1 |
| 3 | A3 | 1 | 1 | | | | | | | | | | | | | 0 | 7 |
| | B3 | 1 | 1 | | | | | | | | | | | | | | 7 |
| 4 | A4 | | | 1 | | | | | | | | | | | | 0 | 1 |
| | B4 | | | 1 | | | | | | | | | | | | | 1 |
| 7 | A7 | 1 | 1 | 1 | | | | | | | | | | | | 0 | 15 |
| | B7 | 1 | 1 | 1 | | | | | | | | | | | | | 15 |
| 8 | A8 | | | | 1 | | | | | | | | | | | 0 | 1 |
| | B8 | | | | 1 | | | | | | | | | | | | 1 |
| 15 | A15 | 1 | 1 | 1 | 1 | | | | | | | | | | | 0 | 31 |
| | B15 | 1 | 1 | 1 | 1 | | | | | | | | | | | | 31 |
| 16 | A16 | | | | | | | | | | | | | 1 | | 32 | 33 |
| | B16 | | | | | | | | | | | | | | 1 | | 33 |
| 31 | A31 | 1 | 1 | 1 | 1 | | | | | | | | | 1 | | 32 | 31 |
| | B31 | 1 | 1 | 1 | 1 | | | | | | | | | | 1 | | 31 |
| 32 | A32 | | | | | 1 | | | | | | | | | 1 | 32 | 33 |
| | B32 | | | | | 1 | | | | | | | | 1 | | | 33 |
| 47 | A47 | 1 | 1 | 1 | 1 | 1 | | | | | | | | | 1 | 32 | 63 |
| | B47 | 1 | 1 | 1 | 1 | 1 | | | | | | | | 1 | | | 63 |
| 48 | A48 | | | | | | | | | | | | 1 | 1 | | 32 | 33 |
| | B48 | | | | | | | | | | | | 1 | | 1 | | 33 |
| 79 | A79 | 1 | 1 | 1 | 1 | 1 | | | | | | 1 | | 1 | | 64 | 63 |
| | B79 | 1 | 1 | 1 | 1 | 1 | | | | | | | 1 | 1 | | | 63 |
| 80 | A80 | | | | | | 1 | | | | | | 1 | 1 | | 64 | 65 |
| | B80 | | | | | | 1 | | | | | 1 | | 1 | | | 65 |
| 111 | A111 | 1 | 1 | 1 | 1 | 1 | 1 | | | | | | 1 | | 1 | 96 | 127 |
| | B111 | 1 | 1 | 1 | 1 | 1 | 1 | | | | | 1 | | 1 | | | 127 |
| 112 | A112 | | | | | | | | | 1 | | 1 | | 1 | | 96 | 97 |
| | B112 | | | | | | | | | 1 | | | 1 | | 1 | | 97 |
| 175 | A175 | 1 | 1 | 1 | 1 | 1 | 1 | | | | 1 | 1 | | 1 | | 128 | 127 |
| | B175 | 1 | 1 | 1 | 1 | 1 | 1 | | | 1 | | 1 | | 1 | | | 127 |
| 176 | A176 | | | | | | | 1 | | 1 | | 1 | | 1 | | 128 | 129 |
| | B176 | | | | | | | 1 | | | 1 | 1 | | 1 | | | 129 |
| 239 | A239 | 1 | 1 | 1 | 1 | 1 | 1 | 1 | | 1 | | | 1 | 1 | | 224 | 255 |
| | B239 | 1 | 1 | 1 | 1 | 1 | 1 | 1 | | | 1 | 1 | | | 1 | | 255 |
| 240 | A240 | | | | | | | | 1 | | 1 | 1 | | | 1 | 224 | 255 |
| | B240 | | | | | | | | 1 | 1 | | | 1 | 1 | | | 255 |

F I G . 1 1

| | | FIRST GROUP | | | | | | | | | | | | SECOND GROUP | | | | | | | |
|---|---|---|---|---|---|---|---|---|---|---|---|---|---|---|---|---|---|---|---|---|---|
| SUBFRAME | | SF1 | SF2 | SF3 | SF4 | SF5 | SF6 | SF7 | SF8 | SF9 | SF10 | SF11 | SF12 | SF13 | SF14 | SF15 | SF16 | SF17 | SF18 | DISPLAY PERIOD DIFFERENCE | |
| DISPLAY PERIOD | | 1 | 2 | 4 | 8 | 16 | 32 | 32 | 32 | 32 | 32 | 32 | 32 | 16 | 16 | 8 | 8 | 4 | 4 | | |
| GRADATION LEVEL | GROUP | | | | | | | | | | | | | | | | | | | AB | AB' A'B |
| 0 | A0 | | | | | | | | | | | | | | | | | | | 0 | 1 |
| | B0 | | | | | | | | | | | | | | | | | | | | 1 |
| 1 | A1 | 1 | | | | | | | | | | | | | | | | | | 0 | 3 |
| | B1 | 1 | | | | | | | | | | | | | | | | | | | 3 |
| 2 | A2 | | 1 | | | | | | | | | | | | | | | | | 0 | 1 |
| | B2 | | 1 | | | | | | | | | | | | | | | | | | 1 |
| 3 | A3 | 1 | 1 | | | | | | | | | | | | | | | | | 0 | 7 |
| | B3 | 1 | 1 | | | | | | | | | | | | | | | | | | 7 |
| 4 | A4 | | | | | | | | | | | | | | | | | 1 | | 8 | 9 |
| | B4 | | | | | | | | | | | | | | | | | | 1 | | 9 |
| 7 | A7 | 1 | 1 | | | | | | | | | | | | | | | 1 | | 8 | 15 |
| | B7 | 1 | 1 | | | | | | | | | | | | | | | | 1 | | 15 |
| 8 | A8 | | | | | | | | | | | | | | | | 1 | | | 16 | 17 |
| | B8 | | | | | | | | | | | | | | | 1 | | | | | 17 |
| 15 | A15 | 1 | 1 | | | | | | | | | | | | | | 1 | | 1 | 24 | 31 |
| | B15 | 1 | 1 | | | | | | | | | | | | | 1 | | 1 | | | 31 |
| 16 | A16 | | | | | | | | | | | | | | 1 | | | | | 32 | 33 |
| | B16 | | | | | | | | | | | | | 1 | | | | | | | 33 |
| 31 | A31 | 1 | 1 | | | | | | | | | | | | 1 | 1 | | 1 | | 40 | 39 |
| | B31 | 1 | 1 | | | | | | | | | | | 1 | | 1 | | | 1 | | 39 |
| 32 | A32 | | | 1 | | | | | | | | | | | 1 | 1 | | | 1 | 40 | 41 |
| | B32 | | | 1 | | | | | | | | | | 1 | | 1 | | 1 | | | 41 |
| 35 | A35 | 1 | 1 | 1 | | | | | | | | | | | 1 | 1 | | 1 | | 56 | 47 |
| | B35 | 1 | 1 | 1 | | | | | | | | | | 1 | | | 1 | | 1 | | 47 |
| 36 | A36 | | | | 1 | | | | | | | | | | 1 | | 1 | | 1 | 56 | 57 |
| | B36 | | | | 1 | | | | | | | | | 1 | | 1 | | 1 | | | 57 |
| 43 | A43 | 1 | 1 | 1 | 1 | | | | | | | | | | 1 | | 1 | 1 | | 56 | 55 |
| | B43 | 1 | 1 | 1 | 1 | | | | | | | | | 1 | | 1 | | | 1 | | 55 |
| 44 | A44 | | | | | 1 | | | | | | | | 1 | | | 1 | 1 | | 56 | 57 |
| | B44 | | | | | 1 | | | | | | | | | 1 | 1 | | | 1 | | 57 |
| 59 | A59 | 1 | 1 | 1 | 1 | 1 | | | | | | | | 1 | | 1 | | 1 | | 56 | 63 |
| | B59 | 1 | 1 | 1 | 1 | 1 | | | | | | | | | 1 | | 1 | | 1 | | 63 |
| 60 | A60 | | | | | | 1 | | | | | | | | 1 | | 1 | | 1 | 56 | 57 |
| | B60 | | | | | | 1 | | | | | | | 1 | | 1 | | 1 | | | 57 |
| 91 | A91 | 1 | 1 | 1 | 1 | 1 | 1 | | | | | | | 1 | | | 1 | 1 | | 56 | 63 |
| | B91 | 1 | 1 | 1 | 1 | 1 | 1 | | | | | | | | 1 | 1 | | | 1 | | 63 |
| 92 | A92 | | | | | | 1 | 1 | | | | | | | 1 | 1 | | | 1 | 56 | 57 |
| | B92 | | | | | | 1 | 1 | | | | | | 1 | | | 1 | 1 | | | 57 |
| 123 | A123 | 1 | 1 | 1 | 1 | 1 | 1 | 1 | | | | | | 1 | | 1 | | | 1 | 56 | 63 |
| | B123 | 1 | 1 | 1 | 1 | 1 | 1 | 1 | | | | | | | 1 | | 1 | 1 | | | 63 |
| 124 | A124 | | | | | | 1 | 1 | 1 | | | | | | 1 | | 1 | 1 | | 56 | 57 |
| | B124 | | | | | | 1 | 1 | 1 | | | | | 1 | | 1 | | | 1 | | 57 |
| 155 | A155 | 1 | 1 | 1 | 1 | 1 | 1 | 1 | 1 | | | | | 1 | | | 1 | 1 | | 56 | 63 |
| | B155 | 1 | 1 | 1 | 1 | 1 | 1 | 1 | 1 | | | | | | 1 | 1 | | | 1 | | 63 |
| 156 | A156 | | | | | | 1 | 1 | 1 | 1 | | | | | 1 | 1 | | | 1 | 56 | 57 |
| | B156 | | | | | | 1 | 1 | 1 | 1 | | | | 1 | | | 1 | 1 | | | 57 |
| 187 | A187 | 1 | 1 | 1 | 1 | 1 | 1 | 1 | 1 | 1 | | | | 1 | | 1 | | | 1 | 56 | 63 |
| | B187 | 1 | 1 | 1 | 1 | 1 | 1 | 1 | 1 | 1 | | | | | 1 | | 1 | 1 | | | 63 |
| 188 | A188 | | | | | | 1 | 1 | 1 | 1 | 1 | | | | | | | | | 56 | 57 |
| | B188 | | | | | | 1 | 1 | 1 | 1 | 1 | | | 1 | | 1 | | | 1 | | 57 |
| 219 | A219 | 1 | 1 | 1 | 1 | 1 | 1 | 1 | 1 | 1 | 1 | 1 | | 1 | | | 1 | 1 | | 56 | 63 |
| | B219 | 1 | 1 | 1 | 1 | 1 | 1 | 1 | 1 | 1 | 1 | 1 | | | 1 | 1 | | | 1 | | 63 |
| 220 | A220 | | | | | | 1 | 1 | 1 | 1 | 1 | 1 | | | 1 | 1 | | | 1 | 56 | 57 |
| | B220 | | | | | | 1 | 1 | 1 | 1 | 1 | 1 | | 1 | | | 1 | 1 | | | 57 |
| 251 | A251 | 1 | 1 | 1 | 1 | 1 | 1 | 1 | 1 | 1 | 1 | 1 | | 1 | | 1 | | | 1 | 56 | 63 |
| | B251 | 1 | 1 | 1 | 1 | 1 | 1 | 1 | 1 | 1 | 1 | 1 | | | 1 | | 1 | 1 | | | 63 |
| 252 | A252 | | | | | | 1 | 1 | 1 | 1 | 1 | 1 | 1 | | 1 | | 1 | 1 | | 56 | 57 |
| | B252 | | | | | | 1 | 1 | 1 | 1 | 1 | 1 | 1 | 1 | | 1 | | | 1 | | 57 |

FIG. 12

| | FIRST GROUP | | | | | | | | | | | | SECOND GROUP | | | | | | | | | | | |
|---|---|---|---|---|---|---|---|---|---|---|---|---|---|---|---|---|---|---|---|---|---|---|---|---|
| | SF1 | SF2 | SF3 | SF4 | SF5 | SF6 | SF7 | SF8 | SF9 | SF10 | SF11 | SF12 | SF13 | SF14 | SF15 | SF16 | SF17 | SF18 | SF19 | SF20 | SF21 | SF22 | AB | AB' |
| | 1 | 2 | 4 | 8 | 16 | 32 | 32 | 32 | 32 | 32 | 32 | 32 | 16 | 16 | 8 | 8 | 4 | 4 | 2 | 2 | 1 | 1 | | A'B |
| 0 A0 | | | | | | | | | | | | | | | | | | | | | | | 0 | 1 |
| B0 | | | | | | | | | | | | | | | | | | | | | | | | 1 |
| 1 A1 | | | | | | | | | | | | | | | | | | | | | | 1 | 2 | 3 |
| B1 | | | | | | | | | | | | | | | | | | | | | 1 | | | 3 |
| 2 A2 | | | | | | | | | | | | | | | | | | | | 1 | | | 4 | 5 |
| B2 | | | | | | | | | | | | | | | | | | | 1 | | | | | 5 |
| 3 A3 | | | | | | | | | | | | | | | | | | | | 1 | | 1 | 6 | 7 |
| B3 | | | | | | | | | | | | | | | | | | | 1 | | 1 | | | 7 |
| 4 A4 | | | | | | | | | | | | | | | | | | 1 | | | | | 8 | 9 |
| B4 | | | | | | | | | | | | | | | | | 1 | | | | | | | 9 |
| 5 A5 | | | | | | | | | | | | | | | | | | 1 | | | | 1 | 10 | 11 |
| B5 | | | | | | | | | | | | | | | | | 1 | | | | 1 | | | 11 |
| 6 A6 | | | | | | | | | | | | | | | | | | 1 | | 1 | | | 12 | 13 |
| B6 | | | | | | | | | | | | | | | | | 1 | | 1 | | | | | 13 |
| 7 A7 | | | | | | | | | | | | | | | | | | 1 | | 1 | | 1 | 14 | 15 |
| B7 | | | | | | | | | | | | | | | | | 1 | | 1 | | 1 | | | 15 |
| 8 A8 | | | | | | | | | | | | | | | 1 | | | | | | | | 16 | 17 |
| B8 | | | | | | | | | | | | | | | | 1 | | | | | | | | 17 |
| 15 A15 | | | | | | | | | | | | | | | 1 | | 1 | | 1 | | | 1 | 30 | 31 |
| B15 | | | | | | | | | | | | | | | | 1 | | 1 | | 1 | 1 | | | 31 |
| 16 A16 | | | | | | | | | | | | | 1 | | | | | | | | | | 32 | 33 |
| B16 | | | | | | | | | | | | | | 1 | | | | | | | | | | 33 |
| 31 A31 | | | | | | | | | | | | | 1 | | 1 | | | 1 | | 1 | 1 | | 62 | 61 |
| B31 | | | | | | | | | | | | | | 1 | | 1 | 1 | | 1 | | | 1 | | 61 |
| 32 A32 | 1 | | | | | | | | | | | | 1 | | 1 | | | 1 | | 1 | | 1 | 62 | 61 |
| B32 | 1 | | | | | | | | | | | | | 1 | | 1 | 1 | | 1 | | 1 | | | 61 |
| 33 A33 | | 1 | | | | | | | | | | | 1 | | 1 | | | 1 | 1 | | | 1 | 62 | 61 |
| B33 | | 1 | | | | | | | | | | | | 1 | | 1 | 1 | | | 1 | 1 | | | 61 |
| 34 A34 | 1 | 1 | | | | | | | | | | | 1 | | 1 | | | 1 | 1 | | 1 | | 62 | 61 |
| B34 | 1 | 1 | | | | | | | | | | | | 1 | | 1 | 1 | | | 1 | | 1 | | 61 |
| 35 A35 | | | 1 | | | | | | | | | | 1 | | 1 | | 1 | | 1 | | 1 | | 62 | 61 |
| B35 | | | 1 | | | | | | | | | | | 1 | | 1 | | 1 | | 1 | | 1 | | 61 |
| 38 A38 | 1 | 1 | 1 | | | | | | | | | | 1 | | 1 | | 1 | | | 1 | 1 | | 62 | 61 |
| B38 | 1 | 1 | 1 | | | | | | | | | | | 1 | | 1 | | 1 | 1 | | | 1 | | 61 |
| 39 A39 | | | | 1 | | | | | | | | | 1 | | | 1 | 1 | | | 1 | 1 | | 62 | 61 |
| B39 | | | | 1 | | | | | | | | | | 1 | 1 | | | 1 | 1 | | | 1 | | 61 |
| 46 A46 | 1 | 1 | 1 | 1 | | | | | | | | | 1 | | | 1 | | 1 | | 1 | 1 | | 62 | 61 |
| B46 | 1 | 1 | 1 | 1 | | | | | | | | | | 1 | 1 | | 1 | | 1 | | | 1 | | 61 |
| 47 A47 | | | | | 1 | | | | | | | | | 1 | | 1 | | 1 | | 1 | 1 | | 62 | 61 |
| B47 | | | | | 1 | | | | | | | | 1 | | 1 | | 1 | | 1 | | | 1 | | 61 |
| 62 A62 | 1 | 1 | 1 | 1 | 1 | | | | | | | | | 1 | 1 | | | 1 | | 1 | 1 | | 62 | 63 |
| B62 | 1 | 1 | 1 | 1 | 1 | | | | | | | | 1 | | | 1 | 1 | | 1 | | | 1 | | 63 |
| 63 A63 | | | | | | 1 | | | | | | | 1 | | | 1 | 1 | | 1 | | | 1 | 62 | 61 |
| B63 | | | | | | 1 | | | | | | | | 1 | 1 | | | 1 | | 1 | 1 | | | 61 |
| 94 A94 | 1 | 1 | 1 | 1 | 1 | 1 | | | | | | | | 1 | | 1 | 1 | | 1 | | | 1 | 62 | 63 |
| B94 | 1 | 1 | 1 | 1 | 1 | 1 | | | | | | | 1 | | 1 | | | 1 | | 1 | 1 | | | 63 |
| 95 A95 | | | | | | 1 | 1 | | | | | | 1 | | 1 | | | 1 | | 1 | 1 | | 62 | 61 |
| B95 | | | | | | 1 | 1 | | | | | | | 1 | | 1 | 1 | | 1 | | | 1 | | 61 |
| 126 A126 | 1 | 1 | 1 | 1 | 1 | 1 | 1 | | | | | | | 1 | 1 | | | 1 | | 1 | 1 | | 62 | 63 |
| B126 | 1 | 1 | 1 | 1 | 1 | 1 | 1 | | | | | | 1 | | | 1 | 1 | | 1 | | | 1 | | 63 |
| 127 A127 | | | | | | 1 | 1 | 1 | | | | | 1 | | | 1 | 1 | | 1 | | | 1 | 62 | 61 |
| B127 | | | | | | 1 | 1 | 1 | | | | | | 1 | 1 | | | 1 | | 1 | 1 | | | 61 |
| 158 A158 | 1 | 1 | 1 | 1 | 1 | 1 | 1 | 1 | | | | | | 1 | | 1 | 1 | | 1 | | | 1 | 62 | 63 |
| B158 | 1 | 1 | 1 | 1 | 1 | 1 | 1 | 1 | | | | | 1 | | 1 | | | 1 | | 1 | 1 | | | 63 |
| 159 A159 | | | | | | 1 | 1 | 1 | 1 | | | | 1 | | 1 | | | 1 | | 1 | 1 | | 62 | 61 |
| B159 | | | | | | 1 | 1 | 1 | 1 | | | | | 1 | | 1 | 1 | | 1 | | | 1 | | 61 |
| 190 A190 | 1 | 1 | 1 | 1 | 1 | 1 | 1 | 1 | 1 | | | | | 1 | 1 | | | 1 | | 1 | 1 | | 62 | 63 |
| B190 | 1 | 1 | 1 | 1 | 1 | 1 | 1 | 1 | 1 | | | | 1 | | | 1 | 1 | | 1 | | | 1 | | 63 |
| 191 A191 | | | | | | 1 | 1 | 1 | 1 | 1 | | | 1 | | | 1 | 1 | | 1 | | | 1 | 62 | 61 |
| B191 | | | | | | 1 | 1 | 1 | 1 | 1 | | | | 1 | 1 | | | 1 | | 1 | 1 | | | 61 |
| 222 A222 | 1 | 1 | 1 | 1 | 1 | 1 | 1 | 1 | 1 | 1 | | | | 1 | | 1 | 1 | | 1 | | | 1 | 62 | 63 |
| B222 | 1 | 1 | 1 | 1 | 1 | 1 | 1 | 1 | 1 | 1 | | | 1 | | 1 | | | 1 | | 1 | 1 | | | 63 |
| 223 A223 | | | | | | 1 | 1 | 1 | 1 | 1 | 1 | | 1 | | 1 | | | 1 | | 1 | 1 | | 62 | 61 |
| B223 | | | | | | 1 | 1 | 1 | 1 | 1 | 1 | | | 1 | | 1 | 1 | | 1 | | | 1 | | 61 |

FIG. 13

| DIFFERENCE IN DISPLAY PEROOD BETWEEN ADJACENT GRATION LEVELS | PRIOR ART | PRESENT INVENTION |
|---|---|---|
| ΔD | SF NUMBER | SF NUMBER |
| 255 | 8 | 8 |
| 127 | 9 | 10 |
| 63 | 12 | 12 |
| 31 | 19 | 14 |
| 15 | 34 | 16 |
| 7 | 65 | 18 |
| 3 | 128 | 20 |
| 1 | 255 | 22 |

IMAGE DISPLAY APPARATUS AND METHOD OF DRIVING IMAGE DISPLAY APPARATUS

CROSS-REFERENCE TO RELATED APPLICATIONS

This application is based on and claims the benefit of priority from the prior Japanese Patent Application Nos. 2006-184539 filed on Jul. 4, 2006 and 2007-158112 filed on Jun. 15, 2007, the entire contents of which are incorporated herein by reference.

BACKGROUND OF THE INVENTION

The present invention relates to an image display apparatus driven per pixel and installed in a projection display, a view finder, a head mount display, etc., and a method of driving such an image display apparatus.

A technique to drive an image display apparatus per pixel includes conversion of each frame of digital video signals into several subframes having different display periods shorter than a one-frame period for displaying at a plurality of gradation levels. Such a technique is disclosed in Japanese unexamined patent publication No. 2004-264695, Japanese unexamined patent publication No. 2005-352457, and U.S. Pat. No. 6,151,011, for example.

Increase in the number of subframes in the known technique gives smaller disclination between adjacent pixels (inter-pixel disclination) to enhance display quality such as gradation whereas leads to high costs due to the requirement of higher driving frequency to an image display apparatus, posing a problem of restriction on increase in the number of subframes, in design.

SUMMARY OF THE INVENTION

A purpose of the present invention is to provide an image display apparatus and a method of driving an image display apparatus that can provide improved gradation with less increase of the number of subframes and less visual recognition of disclination between adjacent pixels even if it becomes larger some extent, by restricting the inter-pixel disclination.

The present invention provides an image display apparatus comprising: a display section having a plurality of pixels arranged in a matrix; a converter to convert each of a plurality of frames of a digital video signal into a plurality of subframes having different display periods each shorter than a one-frame period, in order to display the video signal at a plurality of gradation levels; and a memory to store a first subframe pattern to give each of the gradation levels to pixels in odd columns and odd rows and pixels in even columns and even rows among the pixels in the display section and a second subframe pattern to give each of the gradation levels to pixels in odd columns and even rows and pixels in even columns and odd rows among the pixels in the display section; and a driver to drive the pixels in the display section by turning on or off the subframes according to the first and second subframe patterns.

Moreover, the present invention provides a method of driving an image display apparatus having a display section having a plurality of pixels arranged in a matrix, the method comprising the steps of: converting each of a plurality of frames of a digital video signal into a plurality of subframes having different display periods each shorter than a one-frame period, in order to display the video signal at a plurality of gradation levels; and driving the pixels in the display section by turning on or off the subframes according to a first subframe pattern to give each of the gradation levels to pixels in odd columns and odd rows and pixels in even columns and even rows among the pixels in the display section and a second subframe pattern to give each of the gradation levels to pixels in odd columns and even rows and pixels in even columns and odd rows among the pixels in the display section.

BRIEF DESCRIPTION OF DRAWINGS

FIG. 11 is a view of a display pattern indicating subframes and on/off of each subframe at respective gradation levels in the drive mode 1;

FIG. 12 is a view of a display pattern indicating subframes and on/off of each subframe at respective gradation levels in a drive mode 2 according to the present invention;

FIG. 13 is a view of a display pattern indicating subframes and on/off of each subframe at respective gradation levels in a drive mode 3 according to the present invention;

DETAILED DESCRIPTION OF PREFERRED EMBODIMENTS

Embodiments of an image display apparatus and a method of driving an image display apparatus according to the present invention will be disclosed with reference to the attached drawings.

Figure 1:
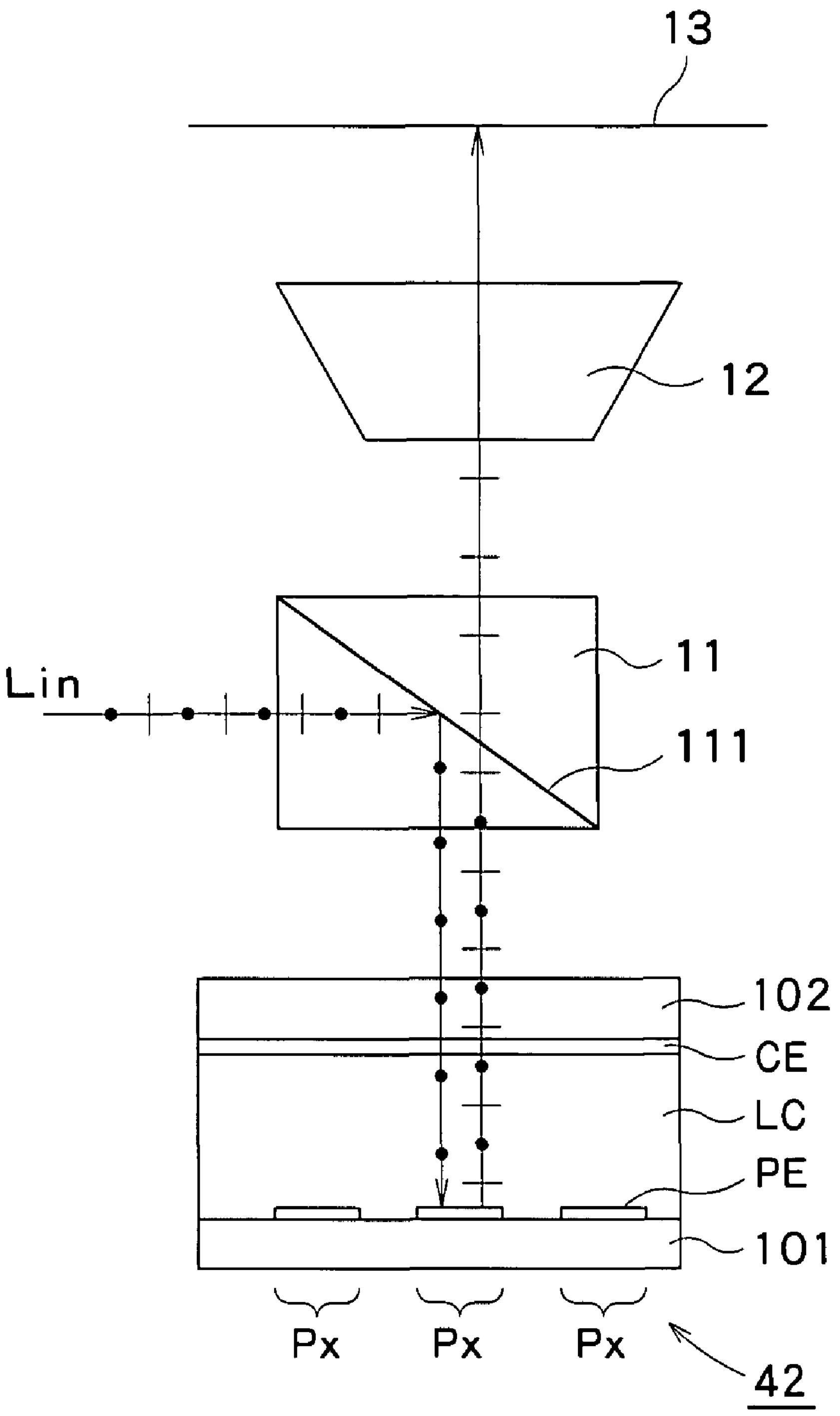
FIG. 1 is a view indicating an outline structure of a projection display as an example of an image display apparatus according to the present invention.

FIG. 1 is a view indicating an outline structure of a projection display as an example of an image display apparatus according to the present invention.

In FIG. 1, an incident light Lin that is generated by a light source (not shown) is launched into a polarization beam splitter 11. The incident light Lin includes an S-polarized light component indicated by a symbol "•" and a P-polarized light component indicated by a symbol "-". The polarization beam splitter 11 is produced so that the S-polarized light component is reflected at a coupling surface 111 whereas the P-polarized light component passes therethrough. Thus, the incident light Lin reflected at the coupling surface 111 of the polarization beam splitter 11 carries the S-polarized light component only and is launched into a display section 42.

The display section 42 has a structure in which a semiconductor substrate 101 having reflective pixel electrodes PE formed thereon for respective pixels Px and a transparent substrate 102 having a transparent opposite electrode CE formed thereon are placed to face each other so that each pixel electrode Px and the opposite electrode CE look inside, and a liquid crystal layer LC is provided between the semiconductor substrate 101 and the transparent substrate 102.

The light carrying the S-polarized light component only and launched into the display section 42 is reflected at each pixel electrode PE and modulated by a liquid crystal of the liquid crystal layer LC according to a video signal. The modulation at the liquid crystal layer LC converts a part of the S-polarized light component of the light emitted from the display section 42 into a P-polarized light component, and hence the light carrying the S- and P-polarized light components is launched into the coupling surface 111 of the polarization beam splitter 11. The light launched into the coupling surface 111 of the polarization beam splitter 11 thus carries the P-polarized light component only and is then projected onto a screen 13 via an objective lens 12. As a result, an image corresponding to a video signal is displayed on the screen 13.

Figure 2:
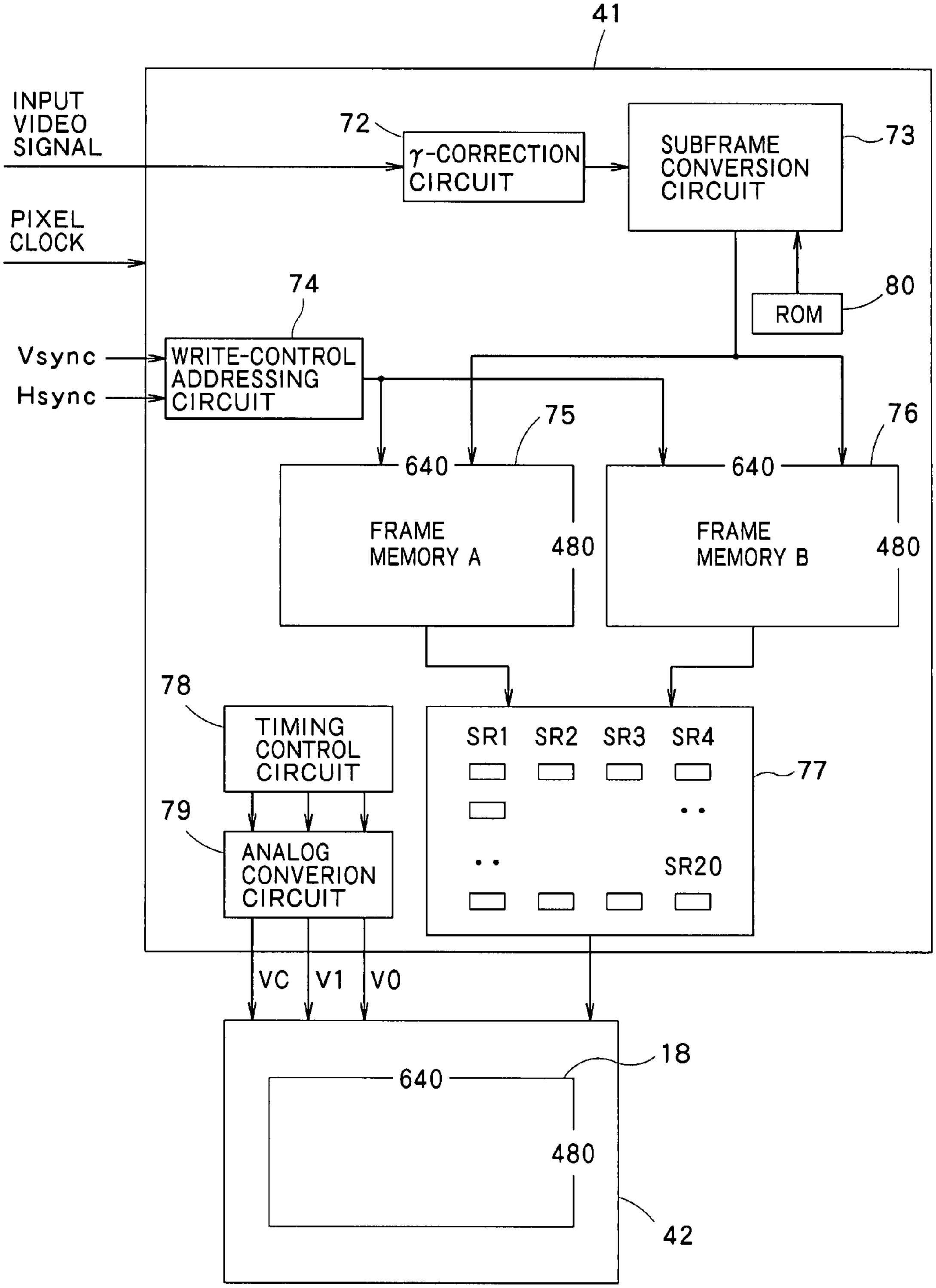
FIG. 2 is a view indicating an outline structure of a driver and a display unit of an image display apparatus according to the present invention.

Explained next is the structure of the image display apparatus. FIG. 2 is a view indicating an outline structure of a driver 41 and the display section 42 of the image display apparatus, an embodiment of the present invention. The driver 41 is equipped with a γ (gamma)-correction circuit 72, a subframe conversion circuit 73, a write-control addressing circuit 74, a frame memory A 75, a frame memory B 76, a logic gate circuit 77, a timing control circuit 78, and an analog conversion circuit 79. The subframe conversion circuit 73 has a storage medium, for example, a ROM 80, for storing a look-up table indicating a correspondence between gradation levels and on/off of subframes, which will be discussed later. Video signals are converted into subframe data while the look-up table of the ROM 80 is being looked up.

Provided in a display unit 18 of the display section 42 are pixels arranged in a matrix of 640 in row×480 in column for 307200 pixels, for example. In structure, the display section 42 has a liquid crystal as a modulation material sealed between a first substrate made of a silicon substrate and having reflective pixel electrodes formed on the surface thereof for the pixels mentioned above and a second substrate, for example, a transparent glass substrate, having a common transparent opposite electrode formed on the surface thereof. Data is transferred with an address applied to each pixel via 640-row electrodes and 480-column electrodes. Provided on the silicon substrate' side is a drive circuit for driving each pixel.

Figures 14, 15:
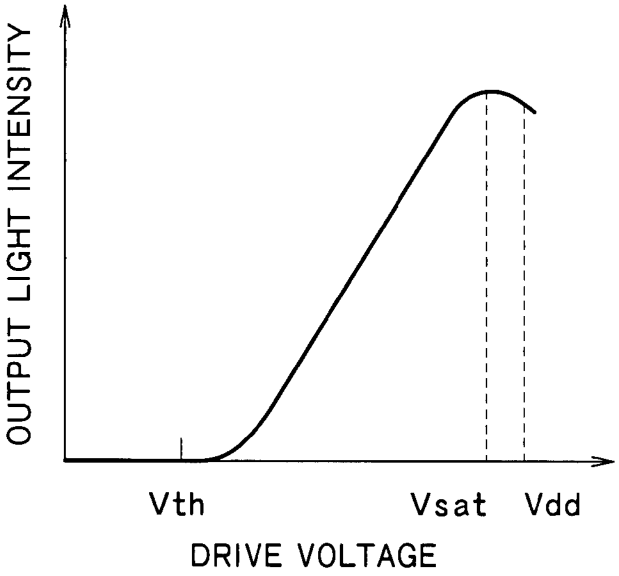
FIG. 14 is a view indicating a relation between a display period difference between adjacent gradations and a required number of subframes (SF) in several drive modes.
FIG. 15 is a view indicating a relation between a drive voltage for driving a liquid crystal and output light intensity.

Here, an input video signal is a digital input signal. Shown in FIG. 15 is a view indicating a relation between a drive voltage for driving a liquid crystal and output light intensity. In FIG. 15, the output light intensity gradually becomes larger as the voltage becomes larger from a threshold voltage Vth and reaches the maximum at a saturation voltage Vsat. An input video signal is usually generated under consideration of the inverse-γ (gamma) characteristics of a CRT, which gives an S-shaped curve in relation of the output light intensity to the drive voltage for the liquid crystal, thus resulting in poor gradation expression when the video signal is directly supplied to the subframe conversion circuit. Therefore, under consideration of the relation indicated in FIG. 15 for the liquid crystal driven at the voltages, the γ-correction circuit 72 performs correction of the inverse-γ characteristics for accurate gradation expression.

The driver 41 operates in synchronization with pixel clocks generated by a PLL circuit (not shown). An input video signal is corrected at the γ-correction circuit 72 and the output signal of the circuit 72 is converted into subframe data at the subframe conversion circuit 73 while looking up the looking-up table stored in the ROM 80.

A vertical synchronization signal (Vsync) and a horizontal synchronization signal (Hsync) separated from the input video signal are supplied to the write-control addressing circuit 74. Based on these synchronization signals, a physical address is designated by a write-control address signal that designates a write address to each frame memory. The data converted by the subframe conversion circuit 73 are written into the subframe memories A 75 and B 76. The subframe memories A 75 and B 76 consist of a group of subframe memories corresponding to the total subframe number. Each subframe memory stores subframe data, the number of which is 640×480, for the pixels.

The subframe data stored in the subframe memories A 75 and B 76 are read out by, 32 bits at a time, for example, and stored in shift registers SR1 to SR20 of the logic gate circuit 77. 640-bit data corresponds to one row of the display unit 18 of the display section 42.

Figure 3:
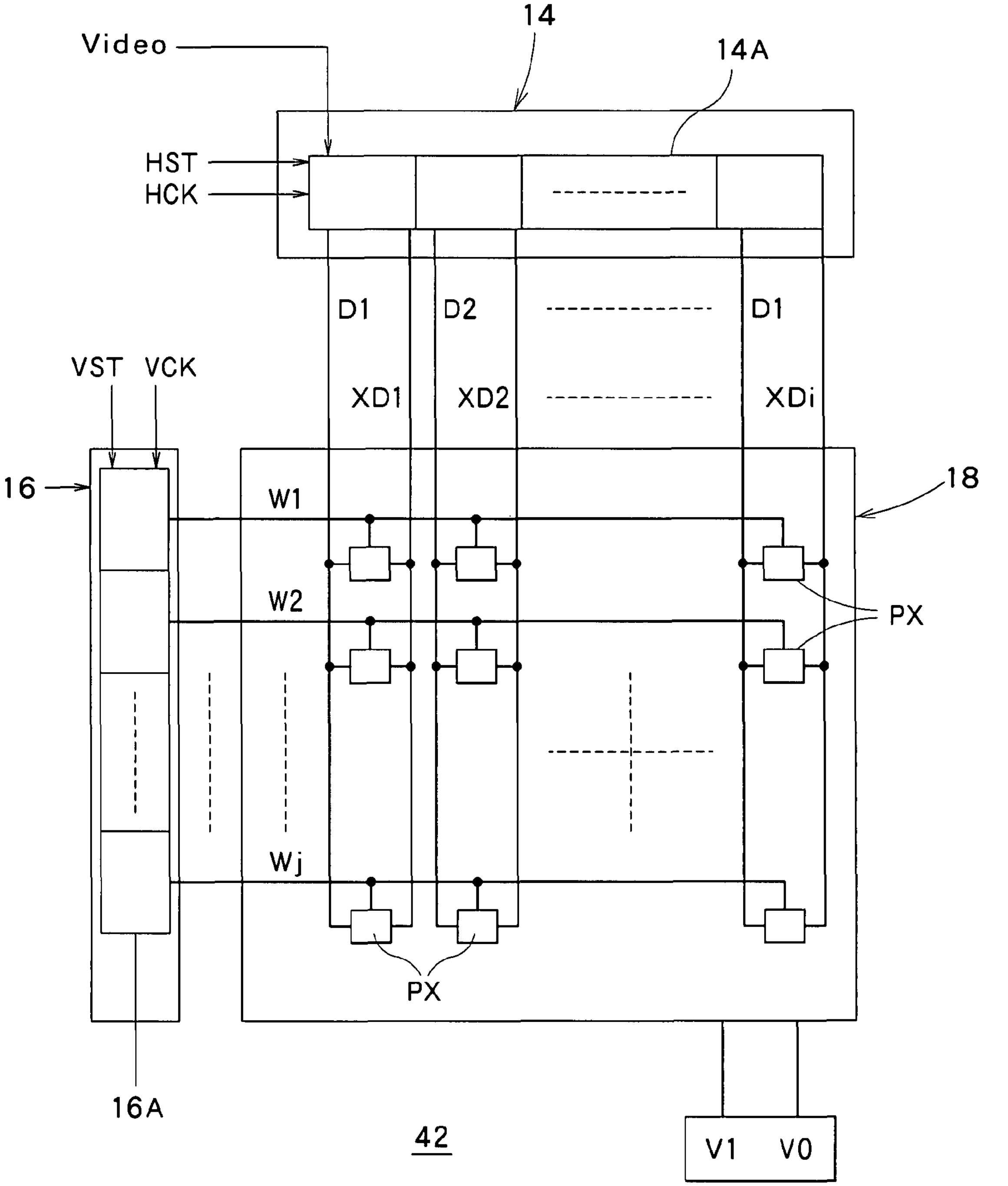
FIG. 3 is a view indicating an outline block diagram of a display unit of an image display apparatus applied to the present invention.

FIG. 3 shows the entire display section 42 which consists of a column-electrode drive circuit 14, a row-electrode drive circuit 16, and the display unit 18. The column-electrode drive circuit 14 has a data shift register 14A horizontally extended therein, that drives column-signal electrodes D (D1, D2, . . . , Di) and reverse column-signal electrodes XD (XD1, XD2, . . . , XDi) that are provided in parallel with the column-signal electrodes D and supply reverse data that are a reversed version of data at the column-signal electrodes D to the pixels. The row-electrode drive circuit 16 has line shift registers 16A, the number of which corresponds to the total display row number, that drive row-scanning electrodes W (W1, W2, . . . , Wj) provided as intersecting the column-signal electrodes D and XD and the number of which corresponds to the total display row number. Provided at the intersection of each column-signal electrode D and the corresponding row-scanning electrode W is a pixel Px, so that the entire pixels Px are arranged in a matrix. External input electrodes V1 and V0 are commonly connected to all of the pixels Px.

In the column-electrode drive circuit 14 with the structure described above, the horizontal data shift register 14A is driven by a horizontal start signal HST and a horizontal shift clock HCK supplied by a drive timing pulse generator (not shown) to sample display data "Video" input per subframe and sequentially supply the data to the column-signal electrodes Di, XD1, D2, XD2, . . . , and Di, XDi. The row-electrode drive circuit 16 has the line shift registers 16A, the number of which corresponds to the total display row number. The line shift registers 16A is driven by a vertical start signal VST in synchronization with a start signal for each subframe and a vertical shift clock VCT in synchronization with a horizontal period supplied by a drive timing pulse generator (not shown) to output pulses sequentially for each horizontal period to the row-scanning electrodes W1, W2, . . . , and Wj. As a result, the display data "Video" are stored per one row or line in a sample hold unit 50 (FIG. 4) of each the pixels Px connected to the row-scanning electrodes W1, W2, . . . , and Wj.

Figure 4:
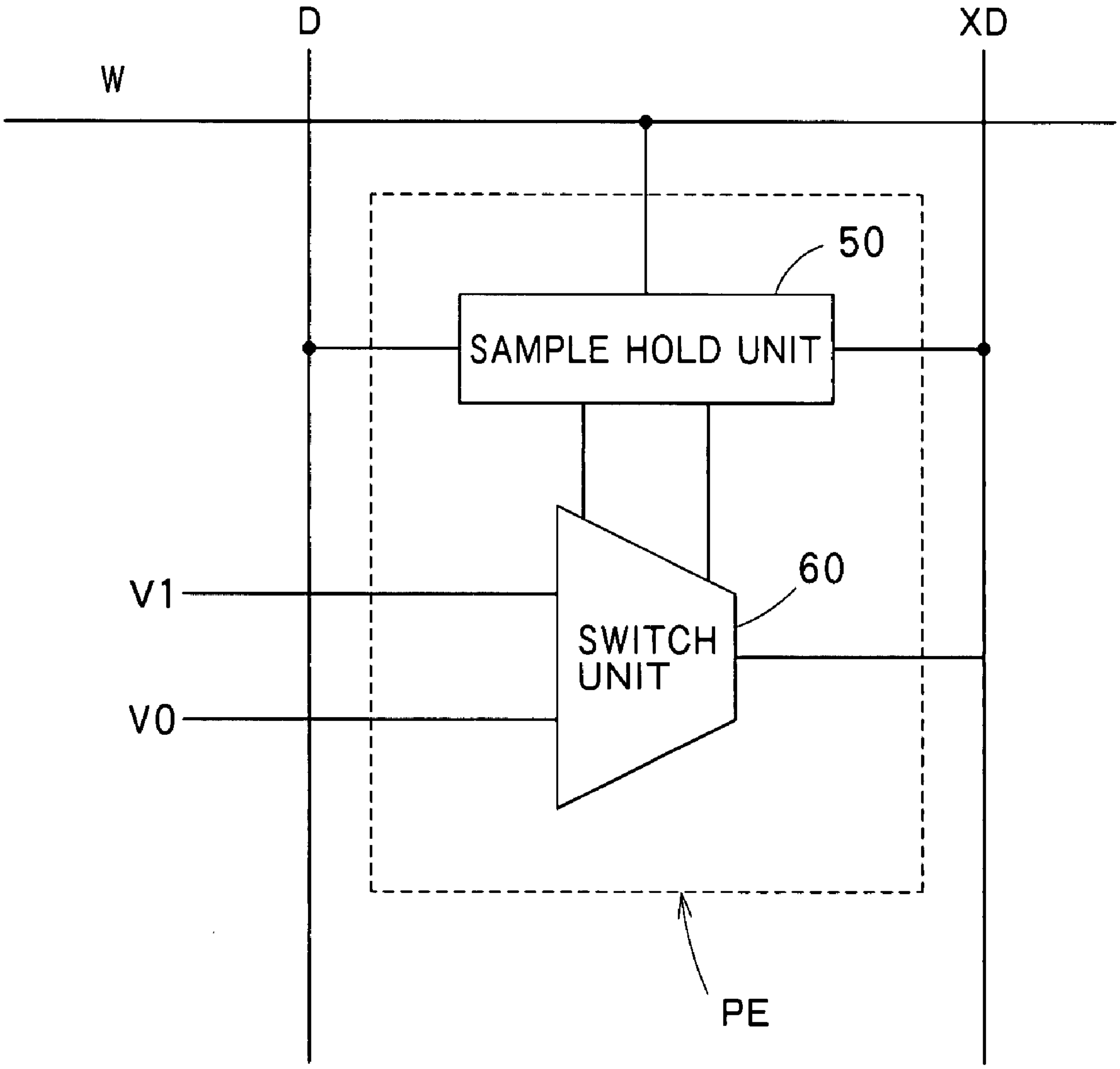
FIG. 4 is a view indicating an outline block diagram of a pixel driver of a display unit of an image display apparatus applied to the present invention.
Figure 5:
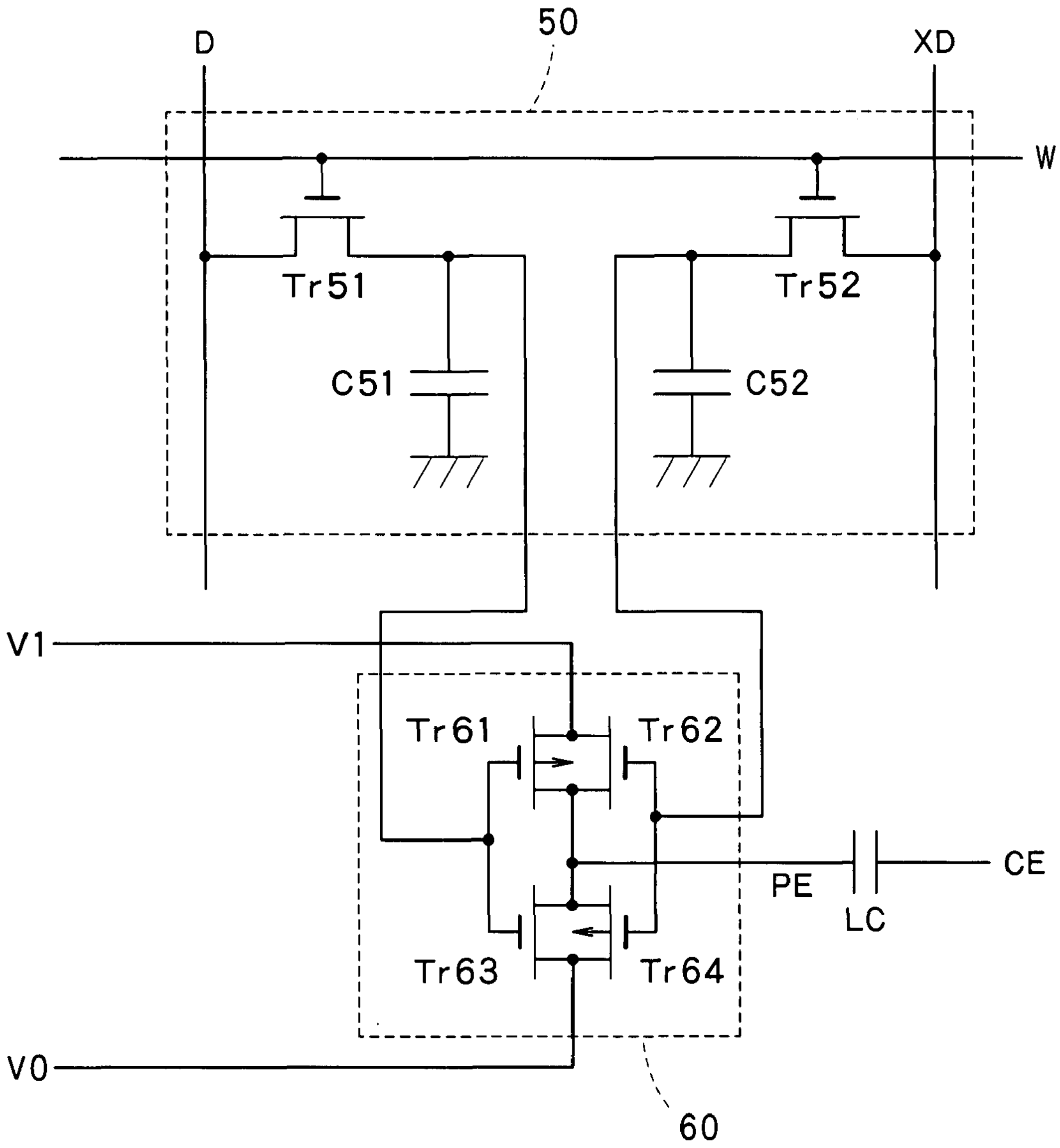
FIG. 5 is a view indicating an example of a pixel driver of a display unit of an image display apparatus applied to the present invention.

Described next with reference to FIGS. 4 and 5 is an example of a pixel drive circuit for each pixel. The pixel drive circuit has a sample hold unit 50 that stores the display data "Video" supplied from the column-electrode drive circuit 14. The output data of the sample hold unit 50 is output to the pixel electrode PE as a voltage via a switch unit 60. The sample hold unit 50 includes one or more of DRAM or SRAM circuits.

The switch unit 60 selects a voltage supplied to the two external input electrodes V1 and V0 according to the output data of the sample hold unit 50. The two external input electrodes V1 and V0 are commonly connected to all of the pixels Px and supplied with two values at a high and a low level of a digital signal of the digital output of the driver 41 (FIG. 2) of the image display apparatus. The switch unit 60 selects voltages supplied to the two external input electrodes V1 and V0 according to the output data of the sample hold unit 50 and supplies the selected voltage to each pixel electrode PE.

In detail, the sample hold unit 50 has two switching transistors Tr51 and TR52 connected in series, the gates thereof being connected to the row-scanning electrode W. The source of the switching transistor Tr51 is connected to the column-signal electrode D whereas the source of the switching transistor Tr52 to the reverse column-signal electrode XD. Connected to between the outputs of the switching transistors Tr51 and TR52 and the earth are capacities C51 and C52, respectively. Voltages stored in the capacities C51 and C52 are supplied to the switch unit 60.

The switch unit 60 includes a transfer gate that consists of a p-channel transistor Tr61 and an n-channel transistor Tr62 and another transfer gate that consists of an n-channel transistor Tr63 and a p-channel transistor Tr62. The digital voltages supplied to the two external input electrodes V1 and V0 are selected according to the voltages stored in the capacities C51 and C52 and output to each pixel electrode PE.

This operation is performed foe all rows, so that data are stored in the capacities C51 and C52 for all pixels. The period for which data are stored in the capacities C51 and C52 for all pixels via the column-signal electrodes D1, D2, . . . , and Di and the reverse column-signal electrodes XD1, XD2, . . . , XDi is defined as a data addressing period. The digital voltages supplied to the two external input electrodes V1 and V0 are set at a high or a low state according to the data stored in the capacities C51 and C52 to set a period of driving the liquid crystal for each subframe. Here, the high and low states correspond to Vdd and 0 volts, respectively, for the digital voltages supplied to the two external input electrodes V1 and V0.

Described next is the operation of the image display apparatus having the structure above in drive modes 1, 2 and 3 according to the present invention. The drive modes described below are just an example and the present invention is not limited to these drive modes.

[Drive Mode 1]

Figure 6:
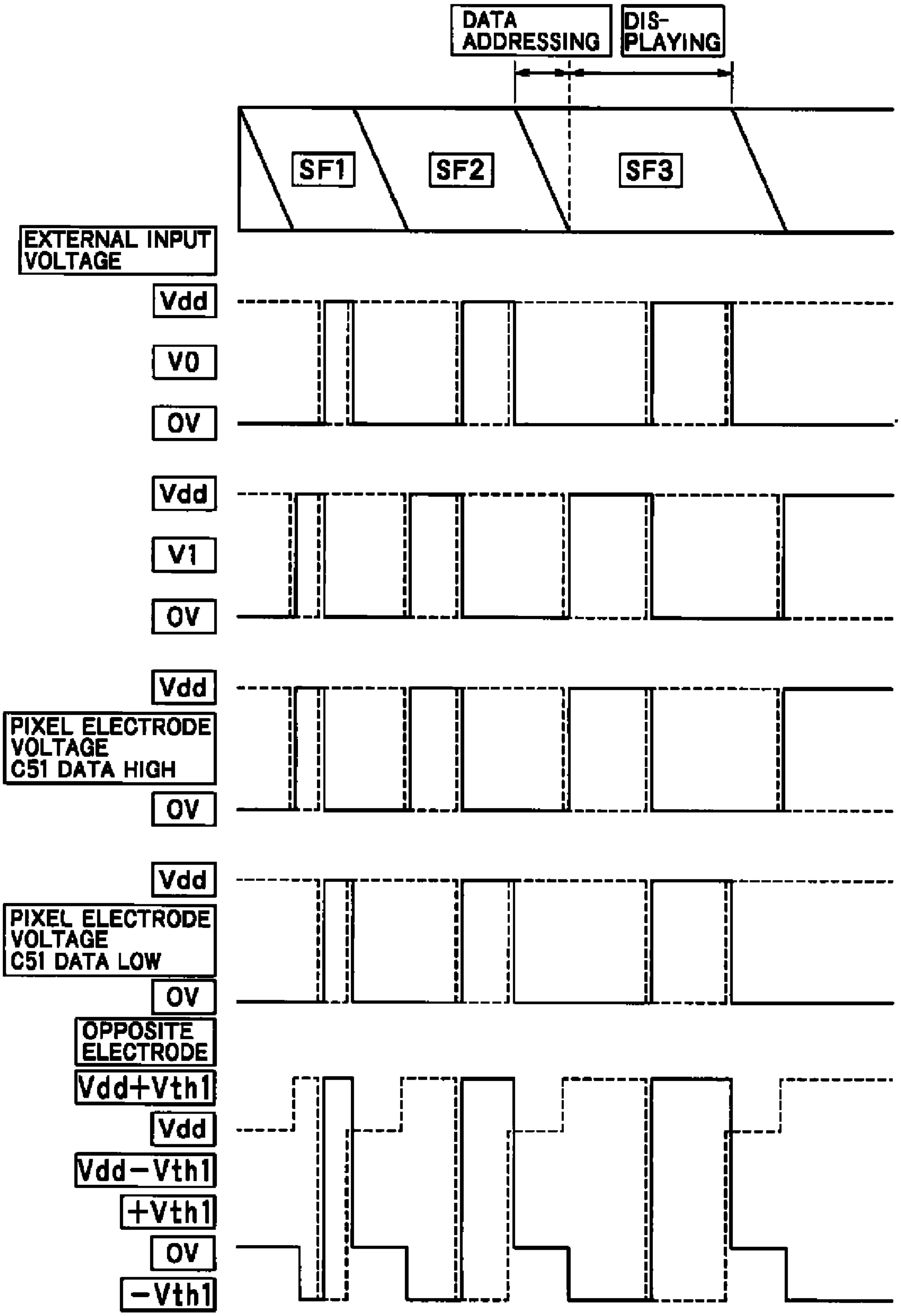
FIG. 6 is a view indicating a time chart of voltages applied to each pixel electrode and the opposite electrode applied to the present invention, in a drive mode 1 according to the present invention.

FIG. 6 shows timing charts indicating respective voltage waveforms in the pixel drive circuit in the drive mode 1 according to the present invention. Each subframe consists of a data addressing period for which data are transferred to all pixels from the column-electrode drive circuit 14 and a display period for which data are displayed while the liquid crystal is driven based on the transferred data. The data addressing period is constant over the subframes whereas the display period depends on the subframes. Each subframe is indicated with SF. For one frame composed of an n number of subframes, subframes SF1 to SFn (n being a positive integer) are turned on or off in displaying for a display period prest for each subframe, which will be discussed later in detail with a display pattern.

Shown in FIG. 6 are timing charts of voltages supplied to the external input electrodes V1 and V0, a pixel-electrode voltage and an opposite-electrode voltage. Subframe periods are continued for one frame. Set as shorter than the minimum subframe period is the period between the moment of completion of the last subframe period to be displayed for one frame and another moment of starting the next frame. Solid and dash lines for each voltage correspond to positive and negative, respectively, of a liquid-crystal drive voltage.

In the timing indicated by the solid line in FIG. 6, 0 volts are applied to the external input electrodes V1 and V0, and the pixel-electrode voltage and opposite-electrode voltage are set at 0 volts for an addressing period (data addressing) per subframe. The voltage to be applied to each of the external input electrodes V1 and V0 is changed from 0 volts to Vdd (a specific period) and to 0 volts between the anterior and posterior sections of the display period for each subframe (SF). The data in the capacity C51 is in the high or low state in both of the anterior and posterior sections of the display period for each subframe to reverse the pixel-electrode voltage from the high or low state to the low or high state. With this transition, the voltage applied to the opposite electrode is changed from "−Vth" to "Vdd+Vth" between the anterior and posterior sections of the display period for each subframe. In other words, voltages at the pixel electrode and the opposite electrode are reversed in the anterior section and in the posterior section of the display period for each subframe. This results in that the liquid-crystal drive RMS voltage changes from positive to negative at the same value to cancel DC components to be applied to the liquid crystal irrespective of the high or low state of the data kept at that state over the anterior and posterior sections of the display period for each subframe. Accordingly, the DC components are canceled for the voltage to be applied to the liquid crystal at during the first subframe (SF1), the same occurs for the increased number of the subframes, the second subframe (SF2), . . . , thus the DC components which otherwise be applied to the liquid crystal being canceled at each subframe.

In the timing indicated by the dash line in FIG. 6, Vdd is applied to the external input electrodes V1 and V0, and the pixel-electrode voltage and opposite-electrode voltage are set at Vdd for an addressing period (data addressing) per subframe. The voltage to be applied to each of the external input electrodes V0 and V1 is changed from Vdd to 0 volts (a specific period) and to Vdd between the anterior and posterior sections of the display period for each subframe. The data in the capacity C51 is in the low or high state in both of the anterior and posterior sections of the display period for each subframe to reverse the pixel-electrode voltage from the low or high state to the high or low state. With this transition, the voltage applied to the opposite electrode is changed from "Vdd+Vth1" to "−Vth" between the anterior and posterior sections of the display period for each subframe.

This results in that the liquid-crystal drive RMS voltage changes from positive to negative at the same value to cancel DC components to be applied to the liquid crystal irrespective of the high or low state of the data kept at that state over the anterior and posterior sections of the display period for each subframe. Accordingly, the DC components are canceled for the voltage to be applied to the liquid crystal at the subframe (SF1), the same occurs for the increased number of the subframes, the second subframe (SF2), . . . , thus the DC components which otherwise be applied to the liquid crystal being canceled at each subframe. The voltage settings to the electrodes are performed in the timing indicated by the solid and dash lines, so that the DC components to be applied to the liquid crystal per subframe is cancelled. Thus, the voltage settings to the electrodes can be combined depending on the timing indicated by the solid and dash lines.

Discussed next is a display pattern for subframes. FIG. 11 is a view of a display pattern indicating subframes and on/off of each subframe at respective gradation levels in the drive mode 1. Shown in this display pattern are 241 gradation levels from 0 to 240. One frame is divided into 14 subframes from SF1 to SF14. In FIG. 11 and the following figures, "1" is shown whereas "0" is not shown in each display pattern.

The feature of this display pattern lies in two different types of groups on the on-and-off pattern for subframes that gives a plurality of gradation levels. One of the two groups (referred to as a group A hereinafter) is assigned to pixels in odd columns and odd rows and pixels in even columns and even rows. The other group (referred to as a group B hereinafter) is assigned to pixels in odd columns and even rows and pixels in even columns and odd rows. The on-and-off pattern for the subframes is divided into two groups of a first group and a second group in which the groups A and B share the same on-and-off pattern for the first group at respective gradation levels whereas the groups A and B have different on-and-off patterns at respective gradation levels for the second group.

In the groups A and B, the on-and-off patterns are created at respective gradation levels to give the minimum difference among the following display periods: a display period that is the total of display periods in the on state in the group A and display periods in the on state in the group B at each gradation level in the different subframe patterns; a display period that is the total of display periods in the on state in the group A at each gradation level and display periods in the on state in the group B at the adjacent gradation levels in the different subframe patterns; and a display period that is the total of display periods in the on state in the group B at each gradation level and display periods in the on state in the group A at the adjacent gradation levels and given different subframe patterns.

This feature is explained with reference to FIG. 11 and also FIGS. 7 to 10.

A combination of two (types) of the group A and the group B is given to each of all gradation levels. A correspondence is shown in FIG. 11 between each gradation level and groups "An" and "Bn" (n being 0 to 240). In the pixel matrix arrangement, data (display pattern) of the group A are given to the pixels in the odd columns and odd rows and the pixels in the even columns and even rows whereas data (display pattern) of the group B are given to the pixels in the odd columns and even rows and the pixels in the even columns and odd rows.

Figure 7:
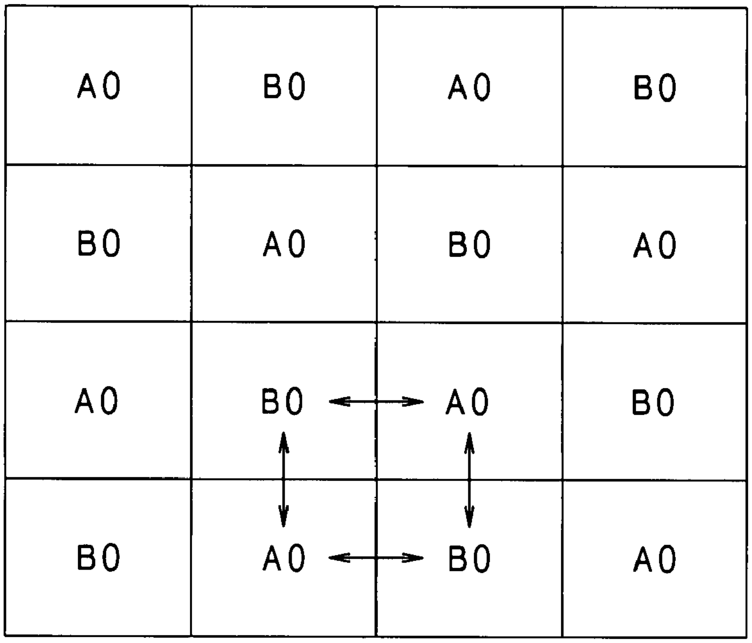
FIG. 7 is a view indicating a pixel arrangement for application of each data of a group A and a group B at a gradation level 0 in the drive mode 1.

For "A0" and "B0" at the gradation level 0 as the gradation level n, for example, as shown in FIG. 7, A0 is given to each pixel in the odd column and odd row and each pixel in the even column and even row whereas B0 to each pixel in the odd column and even row and each pixel in the even column and odd row. In other words, A0 and B0 in the groups A and B, respectively, are given to the pixels in a checkered pattern.

Shown in the rightmost column in FIG. 11 is a display period difference ΔD at each gradation level and a display period difference ΔD between each gradation level and a adjacent gradation level that is different by 1 from the each gradation level. Here, a display period difference [AB] indicates a display period difference between a display period in which the group A is in the on state and a display period in which the group B is in the on state, at each gradation level. A display period difference [AB'] indicates a display period difference between a display period in which the group A is in the on state at each gradation level and a display period in which the group B is in the on state at a gradation level higher by 1 than each gradation level. Moreover, a display period difference [A'B] indicates a display period difference between a display period in which the group B is in the on state at each gradation level and a display period in which the group A is in the on state at a gradation level higher by 1 than each gradation level.

The display period difference indicates the entire length (period difference) of period portions which are displaced with each other in display timing (period), or not overlapped each other, at succeeding two gradation levels, as explained above. In other words, the display period difference is defined as a display period that is the addition of a display period for the group A in the on state at each gradation level and a display period for the group B in the on state at the adjacent gradation level, for which the groups A and B have different subframe patterns. The display period difference is also defined as a display period that is the addition of a display period for the group B in the on state at each gradation level and a display period for the group A in the on state at the adjacent gradation level, for which the groups A and B have different subframe patterns. There are two types of patterns for the group A and the group B at the same gradation level. Thus, the display period difference [AB] between the two groups, or between a display period in which the group A is in the on state and a display period in which the group B is in the on state, at each gradation level, is also referred to as the display period difference ΔD.

The inter-pixel disclinations in the display patterns in the groups A and B at the same gradation level are equal to each other. In FIG. 7, the inter-pixel disclinations are equal to each other on the four borders among the pixels of "A0" and "B0", indicated by arrows. In detail, as shown in FIG. 11, the display period difference [AB] is "0", for example, at the gradation level 1, so that the inter-pixel disclination is "0" on the four borders. The display period difference [AB] is "32" at the gradation level 16, so that the inter-pixel disclination is "32" on the four borders. Moreover, the display period difference [AB] is "224" at the gradation level 240, so that the inter-pixel disclination is "224" on the four borders.

Figure 8:
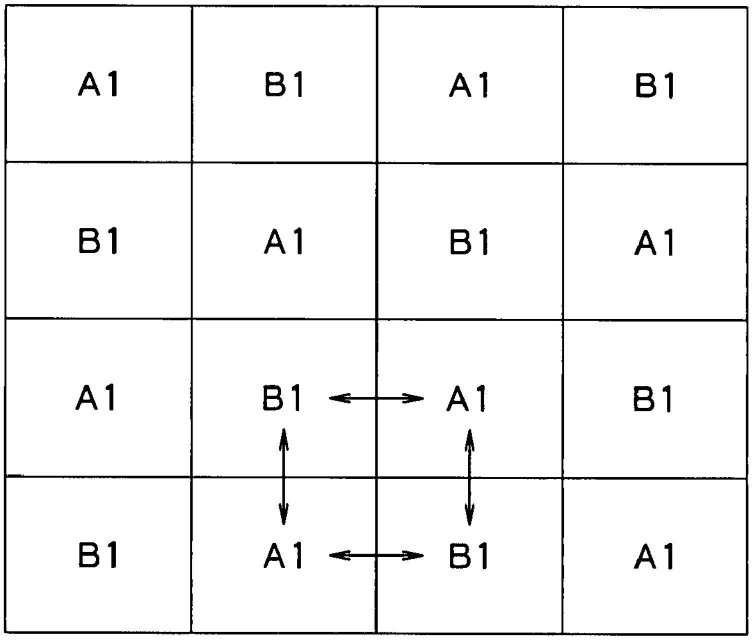
FIG. 8 is a view indicating a pixel arrangement for application of each data of the group A and the group B at a gradation level 1 in the drive mode 1.

Discussed next is the gradation level (n+1) that is different by 1 from the gradation level n. Explained below are "A1" and "B1" at the gradation level 1 different by 1 from the gradation level 0. Like "A0" and "B0", as shown in FIG. 8, A1 is given to each pixel in the odd column and odd row and each pixel in the even column and even row whereas B1 to each pixel in the odd column and even row and each pixel in the even column and odd row. Also, like explained with reference to FIG. 7, the inter-pixel disclination is represented by [AB], which is the same on all borders of pixels.

Figure 9:
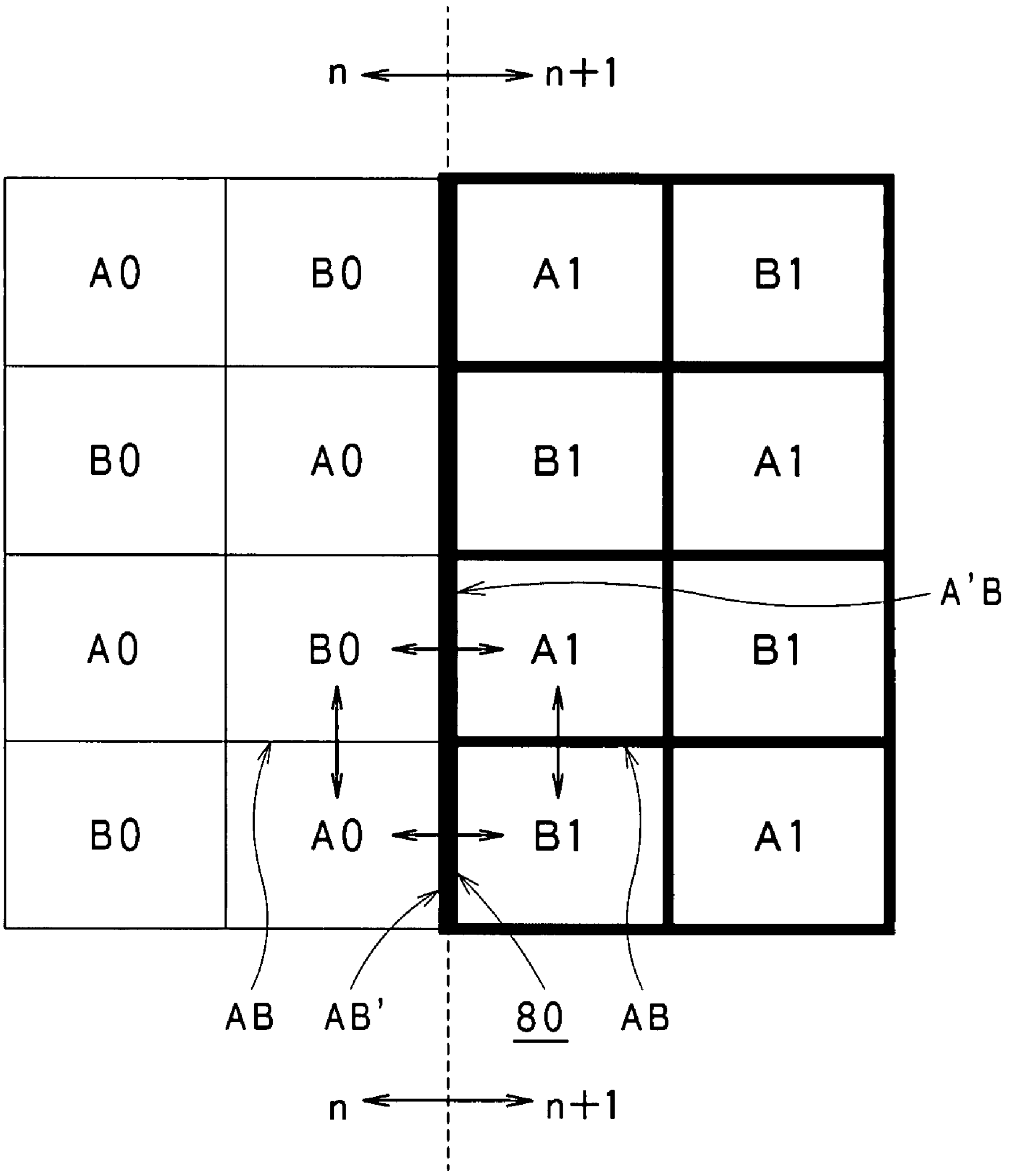
FIG. 9 is a view indicating a pixel arrangement of A0 and B0 at the gradation level 0 and A1 and B1 at the adjacent gradation level 1 in the drive mode 1.

Discussed next is displaying at succeeding two gradation levels on adjacent two pixels. In other words, displaying is performed at the gradation level n and the succeeding gradation level (n+1) on adjacent two pixels. This situation is explained for the gradation level 0 and the gradation level 1, for easier understanding of the present invention. FIG. 9 represents this situation, in which the left half indicates a display pattern at the gradation level 0 or "n" whereas the right half at the gradation level 1 or "n+1".

As shown in FIG. 9, when arrow portions are focused for the pixels in A0 and B0 at the gradation level 0 and the adjacent pixels in A1 and B1 at the gradation level 1, the inter-pixel disclination between A0 and B0 is the same for the pixels in A0 and B0, and the inter-pixel disclination between A1 and B1 is the same for the pixels in A1 and B1. In general, the inter-pixel disclination between A0 and B1 and the inter-pixel disclination between A1 and B0 are different from those between A0 and B0, and A1 and B1, which is recognized as a thick line 80 on a displayed image.

In the present invention, however, the on-and-off pattern is set at each gradation level to give the minimum value of "31" or smaller in the drive mode 1 shown in FIG. 11 among the three types of display period difference [AB], [AB'] and [A'B], the three types of display period difference ΔD discussed above, thus even when the inter-pixel disclination becomes larger, it is hard to recognize in the entire display screen. This is discussed more in detail.

At a gradation level, for example, 239 or 240, the display period differences [AB], [AB'] and [A'B] are large at 244 to 225, the difference among these three types of display period difference is, however, 1 (=225−224), which is very small in this pattern.

At a gradation level 111, the display period differences [AB], [AB'] and [A'B] are at 96 to 127, the difference among these three types of display period difference is 31 (=127−96), which is the maximum value.

The above description is applied to each gradation level, setting the entire display pattern to give the minimum value of 31 or smaller, to the difference among the display periods. As the first feature, in FIG. 9, as the inter-pixel disclination becomes similar on the four pixel borders of A0 and B0, A1 and B1, A0 and B1, and A1 and B0, the disclination between the succeeding two gradation levels becomes smaller when observed on a displayed image. The display pattern arranged in the manner described above is shown in FIG. 11. The feature is given by the groups A and B, the two types of display pattern at each gradation level.

Moreover, the subframes are grouped into two: the anterior first group and the posterior second group, SF1 to SF8 belonging to the anterior first group and SF9 to SF14 to the posterior second group. For the first group, the group A and the group B have the same display pattern at each gradation level. In other words, at each gradation level, the group A and the group B are given the same display pattern for the first group.

On the contrary, for the second group, the group A and the group B are given different on-and-off patterns. And, as the second feature, the on-and-off patterns are arranged for the second group such that the inter-pixel inclination generated on the four borders between A0 and B0, A1 and B1, A0 and B1, and A1 and B0 is the minimum inter-pixel inclination (equal to or smaller than a specific value), in the displaying such as shown in FIG. 9 and discussed above. This arrangement is done for each gradation level. In other words, the arrangement is made to give the minimum value (here, equal to or smaller than 31), to the difference among the three types of display period difference [AB], [A'B] and [AB'].

Figure 10:
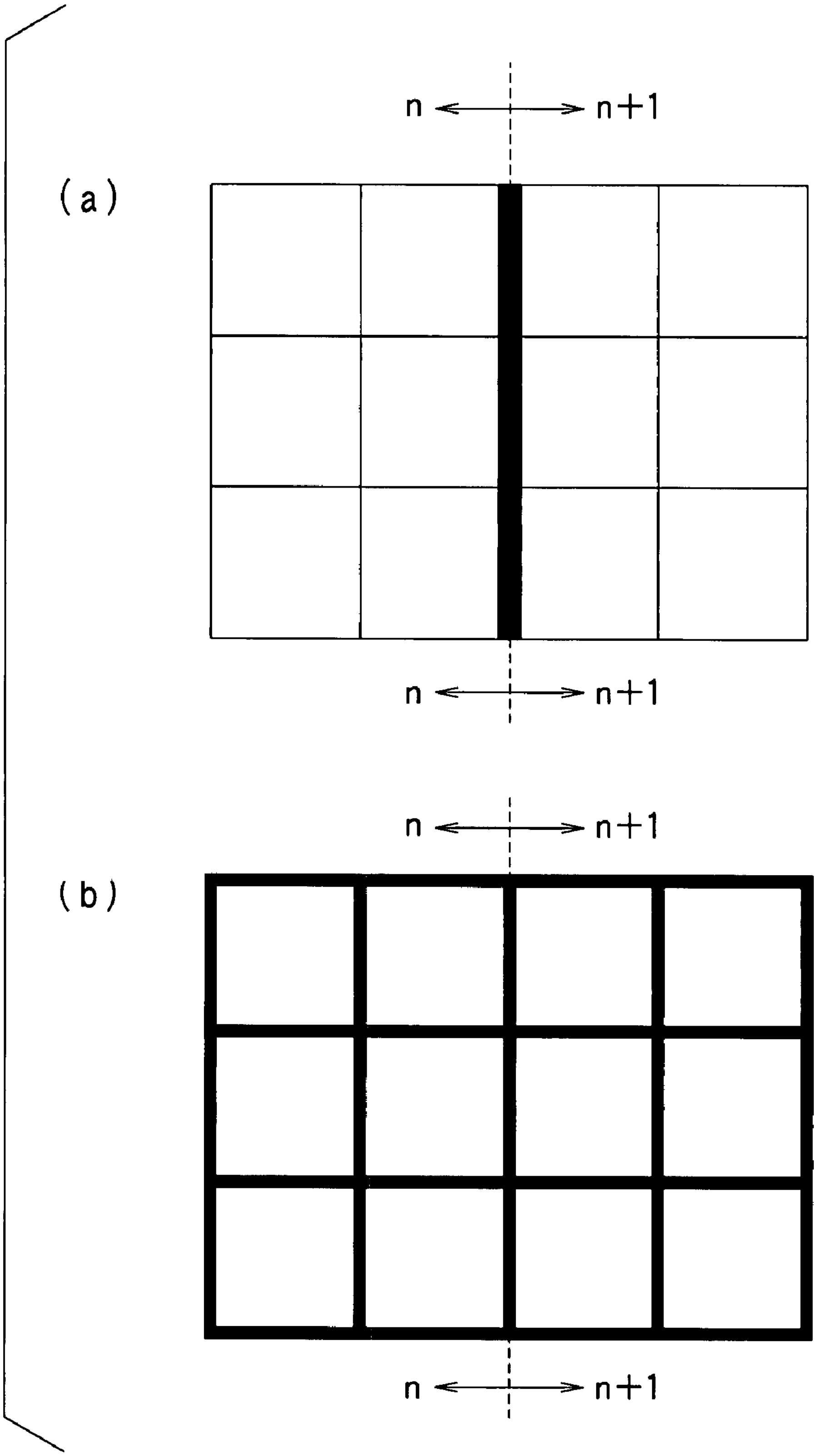
FIG. 10 is an illustration explaining an principle in which inter-pixel disclination is hard to recognize visually even at a lager display period difference between adjacent gradations in the drive mode 1.

Explained next with reference to FIG. 10 is the reason why the inter-pixel inclination is hard to recognize when the difference among the three types of display period difference is smaller even if the display period difference ΔD (inter-pixel inclination) is larger at adjacent gradation levels.

FIG. 10 is a view explaining the reason why the inter-pixel inclination is hard to recognize even if the display period difference is larger at gradation levels. Indicated here is that displaying is made at the gradation level n and the gradation level n+1 in left and right, respectively. Shown in (a) of FIG. 10 is the case in which [A'B] and [AB'] are larger whereas [AB] is smaller among the three types of display period difference ΔD (the difference among the display period differences is larger). This case suffers a larger inter-pixel inclination at sections of a larger display period difference, which is visually recognizable as if there is a vertical thick line in the entire display.

On the contrary, in the case shown in (b) of FIG. 10 in which all of the three types of display period difference ΔD is larger whereas the difference among the three types of display period difference is smaller, although a larger inter-pixel inclination is generated on each borders of pixels (as a thick line), it is hard to recognize macroscopically or in the entire display because the inclination is generated in almost the same pattern of a constant area. The present invention employs this principle to make the inter-pixel inclination be hard to recognize even if it is large.

In FIG. 11, the first group consists of 8 subframes of SF1, . . . , SF8 whereas the second group, 6 subframes of SF9, . . . , SF14. As the gradation level becomes higher by 1 from the level 0, a plural number of the subframes in the first group are sequentially turned on. In the second group, the subframes SF13 or SF14, SF11 or SF12, and SF9 or SF10 are turned on for the first time at the gradation levels 16, 48 and 112, respectively. The subframes in the first group share the same on-and-off pattern in the groups A and B at every gradation level. In contrast, the on-and-off patterns are given to the subframes in the second group such that the subframes are turned on at the same time in A and B, turned on in A but off in B, or turned off in A but on in B, depending on the gradation levels, to give values as much as closer to each other to [AB] that is the display period difference between An (n being a positive integer) and Bn at the same gradation level, [AB'] that is the display period difference between An and Bn at adjacent gradation levels, and [A'B] that is the display period difference between A(n+1) and B0.

In other words, they are arranged such that the display period differences [AB], [AB'] and [A'B] have similar values as much as closer to each other (a smaller value among the differences).

Among the display period differences, [AB'] indicates the display period difference between the group A at the gradation level n and the group B at the adjacent gradation level n+1, [A'B] indicates the display period difference between the group B at the gradation level n and the group A at the adjacent gradation level n+1.

In this drive mode, as shown in FIG. 11, there are pairs of subframes in the second group each pair having the same display period for its two subframes. Each of the display periods for respective pairs is shorter than the longest display period in the first group. And, not all of the display periods shorter than the longest display period but a plural number of the display periods shorter than the longest display period in the first group are selected as such display periods in the second group. There are a plurality of subframe pairs each having the same display period for its two subframes, and displaying is made different in the group A and the group B for at least one of the pairs in the second group, to fulfill the purpose discussed above. In FIG. 11, SF9 and SF10, SF11 and SF12, and SF13 and SF14 constitute pairs and at least one of the pairs have different on-and-off displaying pattern for the group A and the group B.

In FIG. 11, as the gradation level becomes higher, the subframes SF1, . . . , SF8 in the first group are turned on for the first time at gradation levels 1, 2, 4, 8, 32, 80, 176 and 240. The difference among [AB], [AB'] and [A'B] between two succeeding gradation levels is 3 at the gradation level 1, 1 at the gradation level 2, 1 at the gradation level 4, 1 at the gradation level 8, 1 at the gradation level 32, 1 at the gradation level 80, 1 at the gradation level 176, and 31 at the gradation level 240. As the gradation level becomes higher, the difference in the three types of display periods 31 at the gradation level 15 adjacent to the gradation level at which the subframes of the second group are turned on for the first time, likewise, 31 at the gradation level 47, and 31 at the gradation level 111. This value is the minimum value obtained in the display pattern in this drive mode.

FIG. 14 shows the number of subframes (SF) required for the display period difference ΔD between adjacent gradation levels in the prior art (a method, for example, disclosed in U.S. Pat. No. 6,151,011) and the present invention. As shown in FIG. 14, as the display period ΔD between adjacent gradation levels becomes smaller, the required SF number becomes drastically larger in the prior art whereas the drive mode 1 in the present invention requires very small number of subframes when compared to it, thus achieving improvement of gradations with no particular design change and cost up. For the display period ΔD of, for example, 31, the prior art requires 19 subframes whereas the drive mode 1 in the present invention requires 14. Thus, the drive mode 1 offers improved gradations with relatively smaller number of SFs while restricting the inter-pixel discrimination between adjacent gradation levels, which is hard to recognize even if it becomes larger in some degree.

[Drive Mode 2]

Discussed next is a drive mode 2.

Generated in the drive mode 2 is a display pattern shown in FIG. 12. FIG. 12 is a view of a display pattern indicating subframes and on/off of each subframe at respective gradation levels in the drive mode 2 according to the present invention.

The basic concept of the arrangements of the display pattern in the drive mode 2 is the same as the drive mode 1. The drive mode 2, however, provides the total subframe number of 18 with a plurality of subframes that correspond to longer subframes, such as, SF7 and SF8 of the first group in the drive mode 1. Display periods of subframes in the second group in the drive mode 2 are set as shorter than those of the counterparts in the drive mode 1.

In FIG. 12, the first group consists of 12 subframes of SF1, . . . , SF12 and the second group of 6 subframes of SF13, . . . , SF18. As the gradation level becomes higher by 1 from the level 0, a plural number of the subframes in the first group are sequentially turned on. The subframes SF17 or SF18, SF15 or SF16, and SF13 or SF14 are turned on for the first time at the gradation levels 4, 8 and 16, respectively. The subframes of the first group have the same on-and-off pattern in the groups A and B at every gradation level. In contrast, the subframes of the second group are arranged so that they are turned on at the same time in A and B, turned on in A but off in B, or turned off in A but on in B, depending on the gradation levels, to give values as much as closer to each other to [AB] that is the display period difference between An and Bn at the same gradation level, [AB'] that is the display period difference between An and B(n+1) at adjacent gradation levels, and [A'B] that is the display period difference between A(n+1) and Bn, the same as the drive mode 1.

The maximum difference among the three types of display period difference ΔD at each gradation level is 7 and the difference is set at 7 or smaller in the drive mode 2. The gradation levels at which the subframes SF1, . . . , SF12 of the first group are turned on for the first time as the gradation level becomes higher are 1, 2, 32, 36, 44, 60, 92, 124, 156, 188, 220, and 252. The difference among [AB], [AB'] and [A'B] between succeeding two gradations is 3 at the gradation level 1, 1 at the gradation levels 2, 32, 36, 44, 60, 92, 124, 156, 188, 220, and 252, with the maximum value of 7 at the gradation levels 3, 7 and 15 near the gradation levels at which the subframes of the second group are turned on for the first time as the gradation level becomes higher. The value 7 is the minimum value obtained in the arrangements of the display pattern in the drive mode 2. The number of the subframes is 18 that is fewer by one than 19, the number of the subframes in the prior art. The maximum difference among the three types of display period difference [AB], [AB'] and [A'B] is 7 in the drive mode 2, extremely smaller than 31 which is the maximum difference in the prior art.

As shown in FIG. 14, as the display period ΔD between adjacent gradation levels becomes smaller, the required subframe number becomes drastically larger in the prior art whereas the drive mode 2 in the present invention requires very small number of subframes when compared to it, thus achieving improvement of gradations with no particular design change and cost up. For the display period difference ΔD of, for example, 7, the prior art requires 65 subframes whereas the drive mode 2 in the present invention requires 18. Thus, the drive mode 2 has the same advantages as the drive mode 1.

[Drive Mode 3]

Discussed next is a drive mode 3.

Generated in the drive mode 3 is a display pattern shown in FIG. 13. FIG. 13 is a view of a display pattern indicating subframes and on/off of each subframe at respective gradation levels in the drive mode 3 according to the present invention.

The basic concept of the arrangements of the display pattern in the drive mode 3 is the same as the drive modes 1 and 2. The drive mode 3, however, provides several pairs of subrfames in the second group, the two subframes of each pair having the same display period, the display periods of the pairs are equal to those of the subrfames in the first group, except the longest display period in the first group.

In FIG. 13, the first group consists of 12 subframes of SF1, . . . , SF12 and the second group of 10 subframes of SF13, . . . , SF22. As the gradation level becomes higher by 1 from the level 0, a plural number of the subframes in the second group are sequentially turned on. The subframes SF21 and SF22, SF19 and SF20, and SF17 and SF18, SF15 and SF16, and SF13 and SF14 are turned on for the first time at the gradation levels 1, 2, 4, 8 and 16, respectively, in the second group. The subframes in the first group have the same on-and-off pattern in the groups A and B at every gradation level. In contrast, the subframes of the second group are arranged so that they are turned on at the same time in A and B, turned on in A but off in B, or turned off in A but on for B, depending on the gradation levels, to give values as much as closer to each other to [AB] that is the display period difference between An and Bn at the same gradation level, [AB'] that is the display period difference between An and B(n+1) at adjacent gradation levels, and [A'B] that is the display period difference between A(n+1) and Bn, the same as the drive mode 2. The minimum difference among the three types of display period difference ΔD, or [AB], [AB'] and [A'B] at each gradation level is 1, the minimum value obtained in the display pattern in the drive mode 3.

The gradation levels at which the subframes SF1, . . . , SF12 of the first group are turned on for the first time as the gradation level becomes higher are 32, 33, 35, 39, 47, 63, 95, 127, 159, 191, and 223. The difference among [AB], [AB'] and [A'B] between succeeding two gradations is 1 at these gradation levels. The difference is 1 at the gradation levels 1, 2, 4, 8 and 16 at which the subframes of the second group is turned on for the first time as the gradation level becomes higher. The drive mode 3 provides 22 subframes. As shown in FIG. 14, the prior art requires 255 subframes to give 1 to the display period difference between adjacent gradation levels. The drive mode 3 thus has the big advantage of smaller number of subframes than the prior art. Therefore, the drive mode 3 has the same advantages as the drive mode 1.

The display patterns in the drive modes 1 to 3 described above are just examples and any types of display patterns can be employed in the present invention as long as the patterns fulfill the requirements discussed in the present invention. In this respect, FIG. 14 shows SF numbers of other display patterns, although explanation thereof being omitted, in addition to the drive modes 1 to 3.

According to the image display apparatus and the method of driving the image display apparatus, a plurality of subframes are divided into a first subframe pattern to give respective gradation levels to the pixels in the odd columns and odd rows and the pixels in the even columns and even rows among the pixels in the display section and a second subframe pattern to give respective gradation levels to the pixels in the odd columns and even rows and the pixels in the even columns and odd rows among the pixels in the display section, for the first and second subframe-pattern on-and-off driving, thus offering improved gradations with relatively smaller number of subframes while restricting the inter-pixel discrimination between adjacent gradation levels, which is hard to recognize even if it becomes larger in some degree.

What is claimed is:

1. An image display apparatus comprising:

a display section having a plurality of pixels arranged in a matrix;

a converter to convert each of a plurality of frames of a digital video signal into a plurality of subframes having different display periods each shorter than a one-frame period, in order to display the video signal at a plurality of gradation levels; and a memory to store a first subframe pattern to give each of the gradation levels to pixels in odd columns and odd rows and pixels in even columns and even rows among the pixels in the display section and a second subframe pattern to give each of the gradation levels to pixels in odd columns and even rows and pixels in even columns and odd rows among the pixels in the display section; and a driver to drive the pixels in the display section by turning on or off the subframes according to the first and second subframe patterns, wherein the first and second subframe patterns are divided into a first group in which the first and second subframe patterns have identical on-and-off patterns at each gradation level, the subframe pattern of the second group has a pair of subframes identical to each of, at least, two subframes having different display periods shorter than a display period which is longest for the subframes of the first group, and wherein the first and second subframe patterns are arranged so that a difference among a first display period, a second display period and a third display period becomes minimum, the first display period being the total of display periods in an on state in the first subframe pattern and display periods in the on state in the second subframe pattern at each gradation level in different pattern portions of the first and second subframe patterns, the second period being the total of display periods in the on state in the first subframe pattern at each gradation level and display periods in the on state in the second subframe pattern at a gradation level that is higher by at least one than each gradation level in different pattern portions of the first and second subframe patterns, and the third display period being the total of display periods in the on state in the second subframe pattern at each gradation level and display periods in the on state in the first subframe pattern pattern at a gradation level that is higher by at least one than each gradation level in different pattern portions of the first and second subframe patterns.

2. A method of driving an image display apparatus having a display section having a plurality of pixels arranged in a matrix, the method comprising the steps of:

converting each of a plurality of frames of a digital video signal into a plurality of subframes having different display periods each shorter than a one-frame period, in order to display the video signal at a plurality of gradation levels; and driving the pixels in the display section by turning on or off the subframes according to a first subframe pattern to give each of the gradation levels to pixels in odd columns and odd rows and pixels in even columns and even rows among the pixels in the display section and a second subframe pattern to give each of the gradation levels to pixels in odd columns and even rows and pixels in even columns and odd rows among the pixels in the display section, wherein the first and second subframe patterns are divided into a first group in which the first and second subframe patterns have identical on-and-off patterns at each gradation level, the subframe pattern of the second group has a pair of subframes identical to each of, at least, two subframes having different display periods shorter than a display period which is longest for the subframes of the first group, and wherein the first and second subframe patterns are arranged so that a difference among a first display period, a second display period and a third display period becomes minimum, the first display period being the total of display periods in an on state in the first subframe pattern and display periods in the on state in the second subframe pattern at each gradation level in different pattern portions of the first and second subframe patterns, the second period being the total of display periods in the on state in the first subframe pattern at each gradation level and display periods in the on state in the second subframe pattern at a gradation level that is higher by at least one than each gradation level in different pattern portions of the first and second subframe patterns, and the third display period being the total of display periods in the on state in the second subframe pattern at each gradation level and display periods in the on state in the first subframe pattern pattern at a gradation level that is higher by at least one than each gradation level in different pattern portions of the first and second subframe patterns.

* * * * *